United States Patent
Taouil et al.

(10) Patent No.: US 11,861,182 B2
(45) Date of Patent: Jan. 2, 2024

(54) INTEGRATED CIRCUIT DEVICE WITH AN AUTHENTICATION MODULE

(71) Applicant: Technische Universiteit Delft, Delft (NL)

(72) Inventors: Mottaqiallah Taouil, Delft (NL); Cezar Rodolfo Wedig Reinbrecht, Delft (NL); Fethulah Smailbegovic, Delft (NL); Said Hamdioui, Delft (NL)

(73) Assignee: Technische Universiteit Delft, Delft (NL)

( * ) Notice: Subject to any disclaimer, the term of this patent is extended or adjusted under 35 U.S.C. 154(b) by 68 days.

(21) Appl. No.: 17/602,783

(22) PCT Filed: Apr. 7, 2020

(86) PCT No.: PCT/NL2020/050235
§ 371 (c)(1),
(2) Date: Oct. 11, 2021

(87) PCT Pub. No.: WO2020/209714
PCT Pub. Date: Oct. 15, 2020

(65) Prior Publication Data
US 2022/0155977 A1    May 19, 2022

(30) Foreign Application Priority Data
Apr. 9, 2019 (NL) .................................... 2022902

(51) Int. Cl.
*G06F 3/06* (2006.01)
*G06F 12/14* (2006.01)
*H04L 9/08* (2006.01)

(52) U.S. Cl.
CPC .......... *G06F 3/0622* (2013.01); *G06F 3/0655* (2013.01); *G06F 3/0679* (2013.01); *G06F 12/1466* (2013.01); *H04L 9/0861* (2013.01)

(58) Field of Classification Search
CPC .... G06F 3/0622; G06F 3/0655; G06F 3/0679; G06F 12/1466
See application file for complete search history.

(56) References Cited

U.S. PATENT DOCUMENTS

| | | |
|---|---|---|
| 2011/0153944 A1 | 6/2011 | Kursawe |
| 2013/0254636 A1 | 9/2013 | Kirkpatrick et al. |

(Continued)

*Primary Examiner* — Jane W Benner
(74) *Attorney, Agent, or Firm* — N.V. Nederlandsch Octrooibureau (57) ABSTRACT

Integrated circuit device having a processor module (2) in communication with a cache memory module (3, 4), and one or more memory control modules (6, 8, 10) each arranged to interface with an associated storage memory unit (5, 7, 9). An authentication module (15) is provided in communication with the memory control modules (6, 8, 10) and the cache memory modules (3, 4). The authentication module (15) is arranged to generate and store a hardware based secure key, read a predetermined set of data from the associated storage memory units (5, 7, 9), and an associated stored hash value, calculate a hash value of the predetermined set of data using the hardware based secure key; and store the predetermined set of data in the cache memory module (3, 4) only if the calculated hash value corresponds to the associated stored hash value.

14 Claims, 3 Drawing Sheets

(56) References Cited

U.S. PATENT DOCUMENTS

| | | | |
|---|---|---|---|
| 2014/0201540 A1* | 7/2014 | Li | H04L 9/0822 |
| | | | 713/193 |
| 2015/0363594 A1* | 12/2015 | Hunacek | G06F 21/64 |
| | | | 726/22 |
| 2017/0085383 A1 | 3/2017 | Rao et al. | |
| 2017/0153836 A1* | 6/2017 | Kim | G06F 3/0688 |
| 2018/0322314 A1 | 11/2018 | Kim et al. | |
| 2019/0068190 A1 | 2/2019 | Karpinskyy et al. | |
| 2020/0125768 A1* | 4/2020 | Ignatchenko | G06F 21/575 |

* cited by examiner

INTEGRATED CIRCUIT DEVICE WITH AN AUTHENTICATION MODULE

FIELD OF THE INVENTION

The present invention relates to an integrated circuit device comprising a processor module in communication with a cache memory module and with one or more input/output units for external communication, and one or more memory control modules each arranged to interface with an associated storage memory unit. In further aspects, the present invention relates to a method for updating data in such an integrated circuit device, and to a method for setting up a communication path between two such integrated circuit devices.

BACKGROUND ART

US patent publication US2018/322314 discloses a fixed-location Internet-of-Things (IoT) device for protecting secure storage access information and a method for protecting secure storage access information of the fixed-location IoT device. A unique hardware information analysis unit is provided for generating a hardware hash value by analysing unique hardware information, and a network environment information analysis unit for generating a network hash value by analysing the network environment information. An access information encryption key generation unit is provided for generating an access information encryption key using the hardware hash value and the network hash value. It is noted that the generated hash values are not stored in the device.

US patent publication US2015/0363594 discloses a system and method for securely loading data in a cache memory associated with at least one secure processor that performs data processing. Loading of data pages into a secure cache memory SCM is blocked when a comparison of root hash calculations fail.

US patent publication US 2011/0153944 discloses an implementation for secure storage of sensitive data in a computing system. A first dataset that is stored in main memory is accessed and a cache memory is configured to maintain logical consistency between the main memory and the cache. In response to determining that a second dataset is a sensitive dataset, the cache memory is directed to store the second dataset in a memory location of the cache memory without maintaining logical consistency with the dataset and main memory.

US patent publication US2017/0085383 discloses an information handling system (IHS) that includes a system interconnection and a memory component containing basic i/o system instructions to execute during boot up of the IHS. A host processor is in communication with the memory component via the system interconnection to execute the system instructions to configure the IHS. The support processor executes instructions to configure the HS to: calculate a current hash value for the instructions; access a trusted encrypted hash value and the unique key from a secure storage; decrypt the trusted encrypted hash value using the unique key to obtain a trusted hash value; determine whether the current hash value is identical to the trusted hash value; and allow execution of the instructions by the host processor in response to determining that the encrypted current hash value is identical to the trusted hash value.

SUMMARY OF THE INVENTION

The present invention seeks to provide a solution to securing integrated circuit devices applied in Internet-of-Things (IoT) applications against cyber-attacks such as network attacks, malware attacks, fault injection, etc.

According to the present invention, an integrated circuit device as defined above is provided, wherein the integrated circuit device further comprises an authentication module in communication with the memory control modules and the cache memory modules, the authentication module being arranged to generate a hardware based secure key based on hardware features of the integrated circuit device; store the hardware based secure key (e.g. after generating a (unique) secure key), read a predetermined set of data from the associated storage memory units via the memory control modules, and an associated stored hash value, calculate a hash value of the predetermined set of data using the hardware based secure key, and store the predetermined set of data in the cache memory module only if the calculated hash value corresponds to the associated stored hash value.

The combination of features allows to secure the integrated circuit device against cyber-attacks as it is ensured that data retrieved from (internal) memory is authenticated before being used. This can be applied to program (boot) data, and/or to data stored in static or dynamic memory. Furthermore, the additionally required resources are very limited, thus ensuring an efficient and low-cost solution. In essence, it guarantees self-attestation, which means that the device is able to guarantee that programs and data are authentic.

SHORT DESCRIPTION OF DRAWINGS

The present invention will be discussed in more detail below, with reference to the attached drawings, in which.

DESCRIPTION OF EMBODIMENTS

The present invention embodiments present an efficient way of securing IoT (Internet of Things) devices against most cyber-attacks while having a low cost overhead. Examples of attacks are network attacks, malware attacks, fault injection etc. Currently, many different countermeasures are provided. However, they target typically a small set of the attack space and therefore cannot be efficiently used in resource-constrained IoT devices.

IoT devices operate as integrated circuit devices in an untrusted environment (i.e. in the field), but rely on interaction with a central server (or gateway) in a trusted environment. The trusted environment may be a cloud-type of environment which is under specific control, e.g. implemented in the central server/gateway.

The invention embodiments provide a much cheaper and more effective solution. The solution entails an additional integrated circuit device area, however, this overhead is very low as many of the components required are typically already available on a generic IoT device. The invention embodiments use a small IC design IP part that is inserted between the caches of a device and the main memory/flash memory, arranged to perform hashing and verification functionality. As data to the memory has to be either securely hashed or verified (see below) also a time penalty has to be paid. However, this time penalty is marginal as the present invention embodiments reside between the cache and main memory/flash memory of an IoT device, and does not affect the interaction of the processor and caches.

Figure 1:
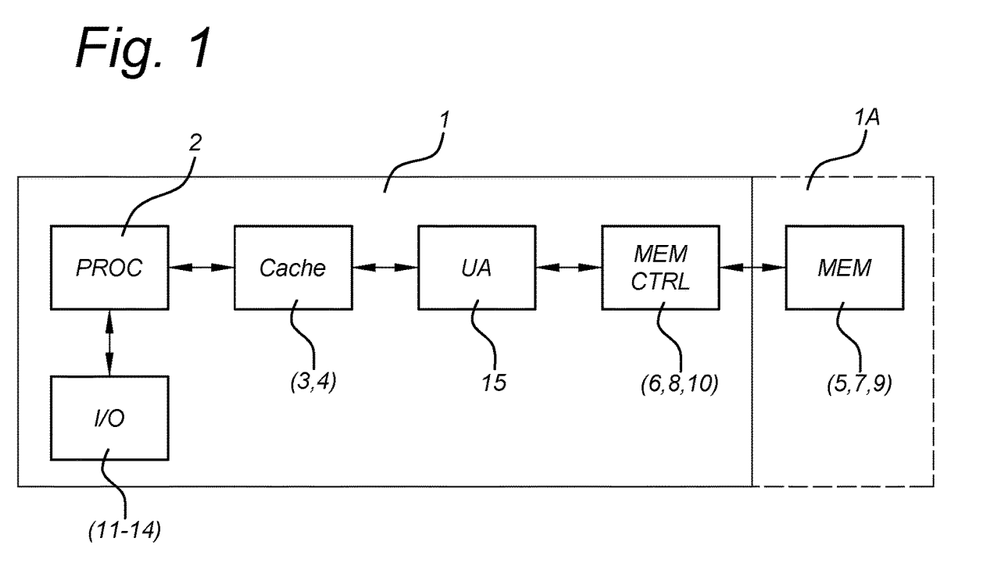
FIG. 1 shows a block diagram of an embodiment of an integrated circuit device according to the present invention.

A generic block diagram of an IoT device (integrated circuit device 1) according to an embodiment of the present invention is shown schematically in FIG. 1. An integrated circuit device 1 is shown comprising a processor module 2 in communication with a cache memory module 3, 4 and with one or more input/output units 11-14 for external communication. One or more memory control modules 6, 8, 10 are present, each arranged to interface with an associated storage memory unit 5, 7, 9. The storage memory units 5, 7, 9 can be an integral part of the integrated circuit device 1, or as shown in the block diagram of FIG. 1, the storage memory units 5, 7, 9 from a device module 1A separate from the rest of the integrated circuit device 1. This architecture allows the integrated circuit device 1 to be operated in a wide variety of applications in a cloud environment, including but not limited to communications, application loading and application execution, secure booting, etc.

In addition, the integrated circuit device 1 further comprises an authentication module 15 (designated with the abbreviation UA for Unique Authentication) in communication with the memory control modules 6, 8, 10 and the cache memory modules 3, 4. The authentication module 15 is arranged to provide specific functionality, i.e. to store a secure key (e.g. after generating a (unique) secure key), to read a predetermined set of data from the associated storage memory units 5, 7, 9 via the memory control modules 6, 8, 10, and an associated stored hash value, to calculate a hash value of the predetermined set of data using the secure key, and to store the predetermined set of data in the cache memory module 3, 4 only if the calculated hash value corresponds to the associated stored hash value. Thus, the predetermined set of data read from memory is only copied to the cache memory (and thus made accessible to the processor 2) if a calculated and stored hash value match. The authentication module 15 can be implemented as part of the integrated circuit design, i.e. as an additional integrated circuit device area. The authentication module (unit, component, part, etc.) 15 can be seen as a functional part of the integrated circuit design. The secure key can be any digital key associated with the integrated circuit device 1 allowing any type of hash calculations on the predetermined sets of data.

In a further embodiment, the authentication module 15 is further arranged to read a further predetermined set of data from the cache memory module 3, 4, to calculate a hash value of the further predetermined set of data using the secure key, to store the further predetermined set of data in the associated storage memory units 5, 7, 9 via the memory control modules 6, 8, 10, and to store the calculated hash value. This ensures data can only be stored in memory with an associated hash value, which can be verified when retrieving data from the memory 5, 7, 9 for use by the processor 2 (via cache memory 3, 4).

In an even further embodiment, the cache memory module comprises a program cache module 3 and a data cache module 4. By making this division, the hardware design of the integrated circuit device 1 can be optimized (e.g. the program cache module 3 can be optimized for read operations by the processor 2, and the data cache module 4 for read and write operations. Of course, the present invention embodiments also are useable in case the data and program caches 3, 4 are shared.

Figure 2:
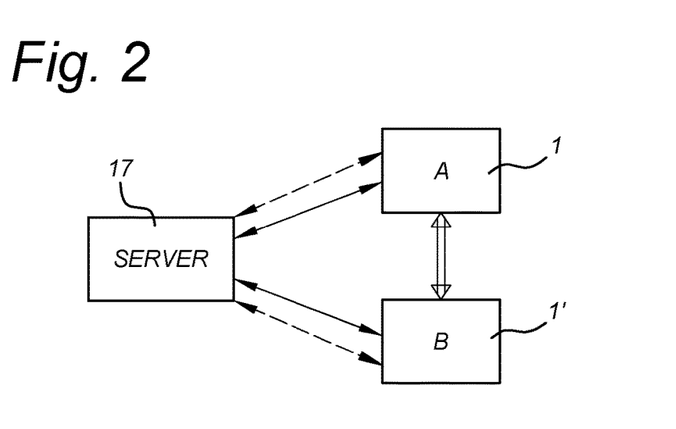
FIG. 2 shows a schematic diagram of a central server communicating with two integrated circuit devices according to the present invention.

FIG. 2 shows a schematic diagram of a central server 17 able to communicate with two integrated circuit devices 1, 1' according to any one of the present invention embodiments. In addition to the (internal) authentication function of the present invention embodiments of the integrated circuit device 1 embodiments, the present invention further relates to a communication protocol that further secures the integrated circuit devices 1. As shown by the various types of arrows in FIG. 2, the communication protocol has device to server/gateway communication and device to device communication. The communication protocol can be implemented by the processor 2 and e.g. may use standard crypto engines.

In a further aspect, the present invention thus relates to a method for updating data in an integrated circuit device 1 according to any one of the present invention embodiments, the method comprising a first authentication by the integrated circuit device 1 of a central server (or gateway) 17, a second authentication of the integrated circuit device 1 by the central server 17, and receiving and storing data by the integrated circuit device 1 sent by the central server 17 only if the first and second authentication are successful. Communication with the gateway/server 17 can happen in a regular fashion (i.e. using any authentication protocol, e.g. using a public and private key). After authentication, the server 17 is then able to install and/or update integrated circuit devices 1. As only the central server 17 can authenticate the integrated circuit device 1, no other device or system is able to install applications on that specific integrated circuit device 1.

Secondly, communication between two integrated circuit devices 1, 1' requires authentication of both devices. For example, when device A wants to communicate with device B, device A has to send this request to the gateway/server 17. Once device A is authorized as a legitimate device, the gateway/server 17 will notify device B that device A wants to communicate with it. If device B is also authenticated by the gateway/server 17, device A will proceed to communicate with device B. During such a communication, device A is not able to install anything on device B. However, device A is authorized to send data to device B in case this is needed. Once device B receives such data it stores it locally using the secure hash function of the authentication unit 15.

In a further aspect therefore, a method is provided for setting up a communication path between two integrated circuit devices 1, 1' according to any one of the present invention embodiments, the method comprising authentication of the two integrated circuit devices 1, 1' by a central server 17, and if authentication is successful, notifying the two integrated circuit devices 1, 1' of their mutual authentication by the central server 17, establishing the communication path between the two integrated circuit devices 1. 1', and exchanging data via the communication path. In a further embodiment, the method initially sets up the communication by having the central server 17 executing the following actions. Receiving a communication request, the communication request comprising a device identification of a first one 1 of the two integrated circuit devices 1; 1', and address identification of the two integrated circuit devices 1, 1', sending a challenge message to a second one 1' of the two integrated circuit devices 1, 1', and receiving a device identification from the second one 1' of the two integrated circuit devices 1, 1'.

The present invention embodiments allow to provide a very good authentication mechanism in machine to machine (M2M) applications, wherein a cloud is able to authenticate a device, and a device is able to authenticate the cloud. The authentication mechanisms applied to obtain this mutual authentication scheme, are as such available in present day IoT standards, such as CoAP, XMPP and DDS.

It is noted that various embodiments as described herein may be combined as indicated by the various claim references in the attached set of claims. Some or all of the resulting embodiments provide a combination of one or more of the specific advantages. In all, the present invention embodiments prevent execution of malware in an integrated circuit device 1, and also the spread of malware in a network of such integrated circuit devices 1. The relevant information cannot be obtained locally (e.g. using sniffing on printed circuit board level). Moreover, typical hardware attacks (fault injection, side channel) are prevented, especially if e.g. the optional encryption is applied. In network environments, the fact that each communication channel between two integrated circuit devices uses a different key helps in preventing attacks. The actual implementation allows to re-use existing hardware blocks in integrated circuit device 1 architectures for IoT applications, and the additional authentication unit 15 hardware is readily implemented.

Figure 3:
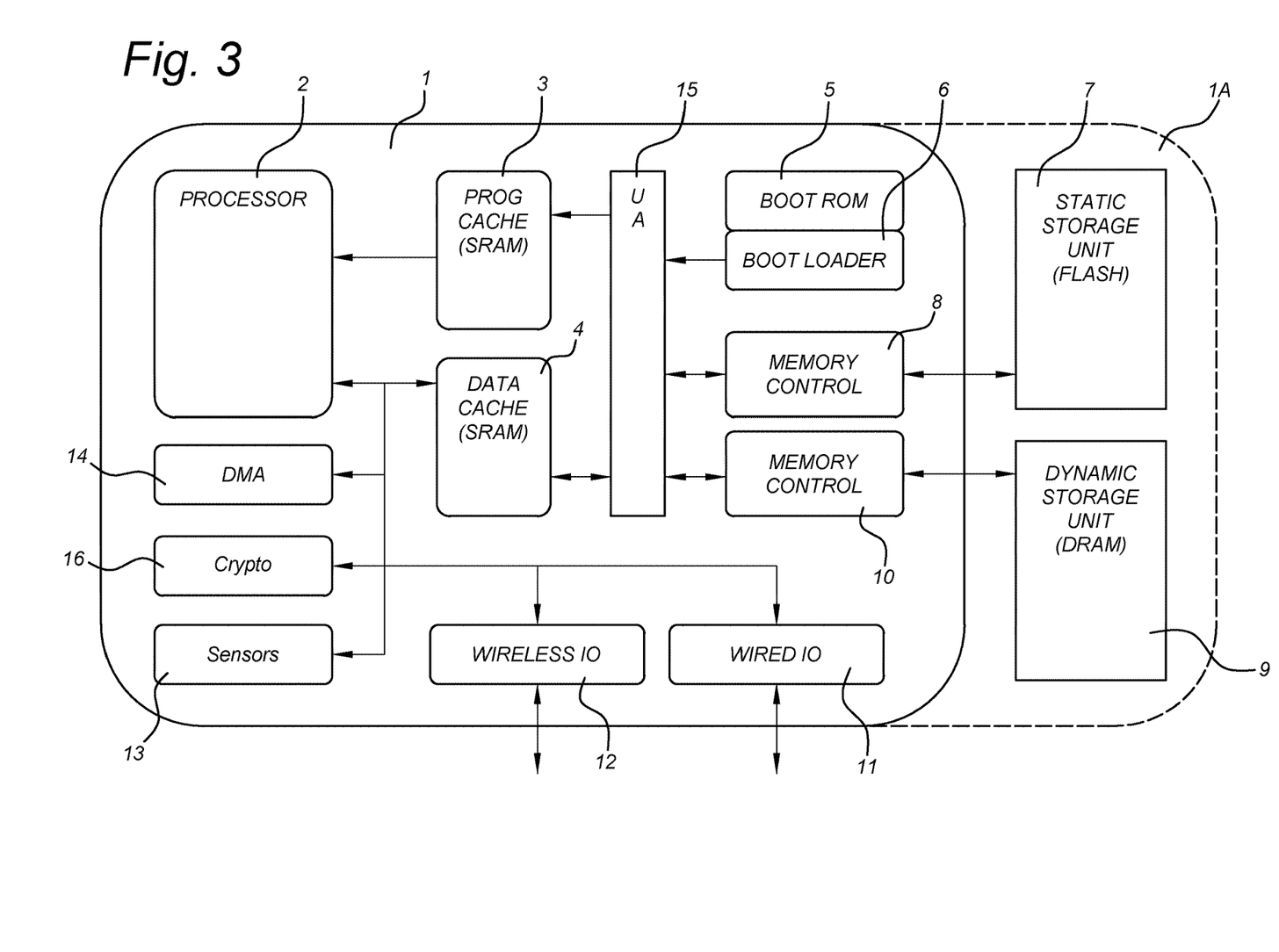
FIG. 3 shows a detailed block diagram of a further embodiment of an integrated circuit device according to the present invention.

FIG. 3 shows a block diagram of an exemplary embodiment of the present invention integrated circuit device 1 in more detail, wherein elements corresponding to components in the FIG. 1 embodiment have the same reference numerals. As discussed above, in this embodiment the processor 2 interfaces with a program cache module 3 and a data cache module 4. Furthermore, input/output units 11-14 for external communication are present in the form of a wired IO unit 11, a wireless IO unit 12, sensor interface 13 and direct memory access unit 14.

As furthermore shown in the block diagram of FIG. 3, the one or more memory control modules comprise a boot loader 6, and the associated storage memory unit comprises a boot read-only memory module 5. These are standard component implementations in integrated circuit design, and allow to store executable data in the boot ROM module 5, which at boot-up is transferred to the program cache module 3 (after the authentication check in the authentication unit 15 as discussed above, in the FIG. 3 embodiment also shown with the reference UA for Unique Authentication).

The present invention embodiments allow to make many of the (cyber) attacks as discussed above useless, as the integrated circuit devices 1 allow only execution of software that is authorized by the integrated circuit device 1 itself (and indirectly authorized by the central server 17 or gateway. I.e., an application binary (executable data) is stored in the boot ROM module 5 with a hash value (signature) generated by the integrated circuit device 1 itself. As a result, this executable data can only be run by the processor 2 on this specific integrated circuit device 1. Furthermore, possibly infected devices 1 cannot spread malware to other devices 1. Although attackers still could gain access remotely by e.g. cracking a password (hijacking), they will not be able to download malicious applications on the hijacked IoT device 1.

In a further embodiment, the one or more memory control modules comprise a static memory control module 8, and the associated storage memory unit comprises a static storage unit 7, e.g. in the form of a Flash memory module. In addition, or alternatively, the one or more memory control modules comprise a dynamic memory control module 10, and the associated storage memory unit comprises a dynamic storage unit 9, e.g. in the form of a DRAM module. Using the authentication checks, and hash value generation by the authentication unit 15 ensures that only authenticated data can be stored and retrieved by the integrated circuit device 1.

Figure 4:
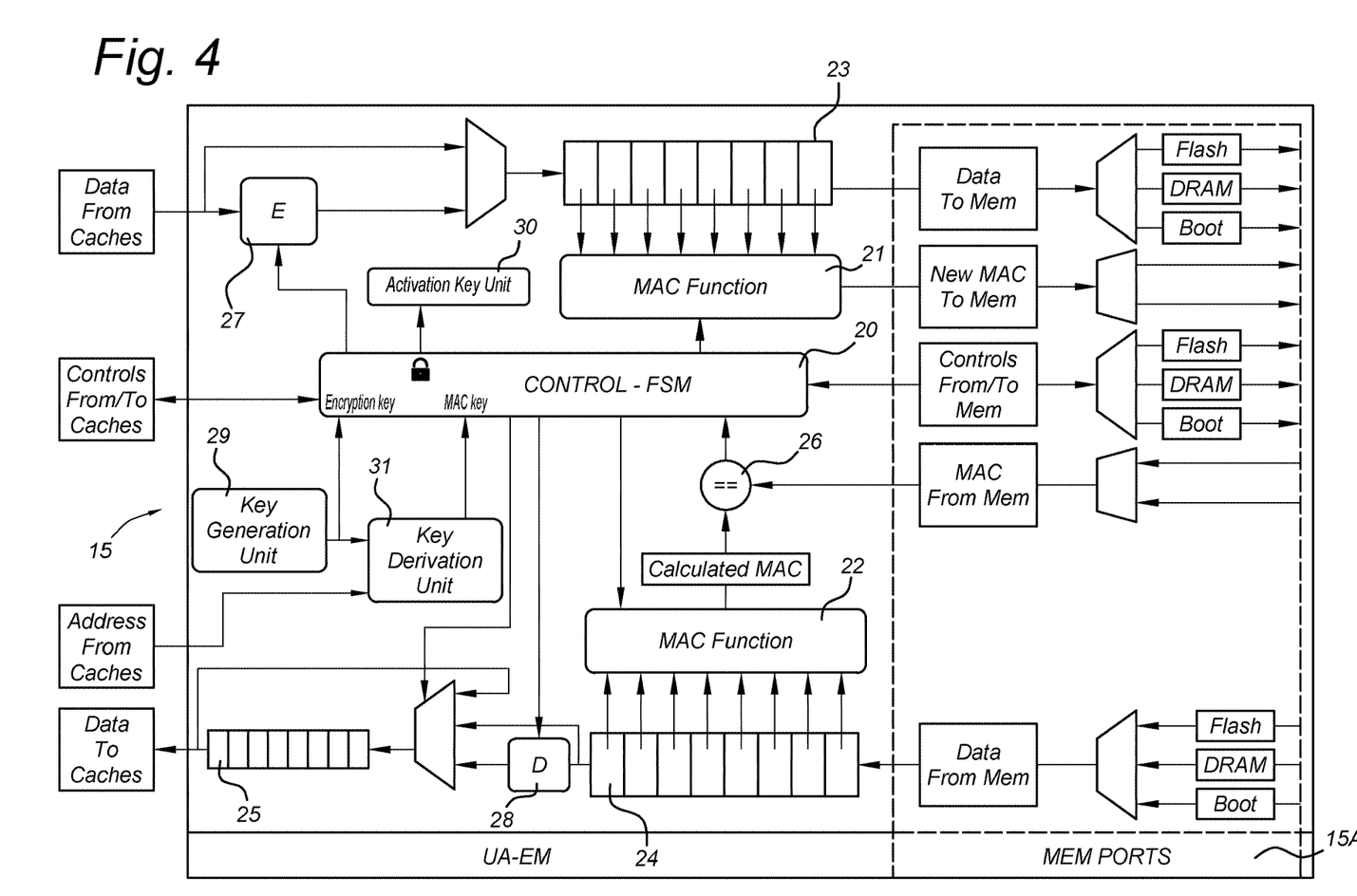
FIG. 4 shows a functional block diagram associated with an embodiment of an authentication unit as part of the integrated circuit device.

FIG. 4 shows a functional block diagram associated with the authentication unit 15 of the embodiment of the integrated circuit device 1 of FIG. 3. The authentication unit 15 communicates with the various memory control modules 6, 8, 10 via the memory ports part 15A, as indicated in FIG. 4 for the various memory variants (boot ROM module 5, static storage unit 7, dynamic storage unit 9). Data and hash values (or message authentication codes, MAC) are transferred via the memory ports part 15A. Furthermore, a control unit 20 is provided in order to provide the proper control signals to the various memory variants (storage memory units 5, 7, 9 via the memory control modules 6, 8, 10). Similarly, data can be transferred from/to the cache memory modules 3, 4, again under control from the control unit 20 (left side of FIG. 4 functional block diagram). The predetermined sets of data are temporarily stored in shift registers (or buffers) 23, 24, 25, and where appropriate, hash values are calculated by respective MAC function blocks 21, 22.

As shown in the lower part of the functional block diagram of FIG. 4, a predetermined set of data is received via the memory ports part 15A from the associated storage memory units 5, 7, 9 via the memory control modules 6, 8, 10, as well as an associated stored hash value (MAC). Using shift register 24 and MAC function block 22, a hash value of the predetermined set of data using the secure key is calculated, the secure key being obtained via control unit 20. The calculated hash value (MAC) is compared to the associated and retrieved stored hash value in comparator unit 26. In cooperation with the control unit 20, the predetermined set of data is transferred to the cache memory module 3, 4 only if the calculated hash value corresponds to the associated stored hash value (using shift register 25 if necessary).

A similar functionality is shown in the functional block diagram of FIG. 4 for transferring a further predetermined set of data from the cache memory module 3, 4 to the storage memory units 5, 7, 9, now using shift register 23 and MAC function block 21.

In addition, the security concept of the above described embodiments is enhanced by encrypting/decrypting the data stored in the device 1 as well. As a result, both data and operations are further obfuscated at run-time thereby preventing malware injection through data and fault injection attacks. A huge benefit of this embodiment is that it renders all network attacks useless as long as proper encryption is used during communication with the central server 17 and/or other devices 1. To this end, the authentication module 15 further comprises an encryption unit 27 for encrypting data before storage in the associated storage memory units 5, 7, 9 via the one or more memory control modules 6, 8, 10. Furthermore, the authentication module 15 may further comprise a decryption unit 28 for decrypting data before storage in the cache memory module 3, 4.

In a further embodiment, the authentication module 15 further comprises a (unique) secure key generation unit 29. In the exemplary embodiment shown in FIG. 4, this (unique) secure key generation unit 29 is in communication with control unit 20, which ensures proper triggering of the secure key generation unit 29 and internal usage of the secure key to the MAC function blocks 21, 22. This allows to secure the application using authenticated software (stored in the boot ROM module 5), i.e. using signing of the software (program data) with secret information which only is known in the integrated circuit device 1 itself and in the central server 17 (as part of the device authentication process, see above).

In the embodiment shown in FIG. 4, furthermore a derived key generation unit 31 is present, in communication with the control unit 20, key generation unit 29, and (external to authentication module 15) an address input from the cache memory module 3, 4. The derived key generation unit 31 is used to generate multiple keys from a primary key (provided by key generation unit 29). Key derivation techniques are typically used to generate unique keys per transaction/communication or for key encrypting keys. Key derivation functions are often based on MACs (message authentication codes) or hash functions. The derived keys (referred to as MAC keys) as output from the key derivation unit 31 can be used in this application as input keys to the MAC function blocks 21, 22 or encryption/decryption blocks 27, 28. A unique MAC key is generated per memory address (e.g., Flash, DRAM). As a result, each address in the memory (e.g., Flash, DRAM) will use a MAC key that is only valid for that address. This prevents attacks where an adversarial tries to modify the location of data in the memory (with their corresponding hashes). This solution will be able to detect this, as a different key (i.e. based on the original address of that data) would be needed to validate the calculated MAC. However, as the address changed (as the data is moved to another location) the used MAC key will differ, and hence the validation of the hash will fail and the tampering can be detected.

The derived key can be generated by the key derivation unit 31 in different ways, such as:
- A simple XOR operation between the unique key generated from the key generation unit 29 and the memory address of the read or write operation.
- A keyed hashed function (i.e., MAC) where the unique key from the key generation unit 29 is used as key and the address as message.
- An encryption where the unique key from the key generation unit 2) is used as key and the address as message.

In a further embodiment, the (unique) secure key generation unit 29 may be arranged to generate a secure key which is determined based on hardware features of the integrated circuit device 1. Such type of hardware based unique key generation is e.g. obtained through specialized circuits known as Physically Unclonable Functions (PUFs). Other unique key generation methods can be realized by storing unique codes in E-fuses (electrical fuses) or tamper-proof memory. In a further embodiment, the authentication module 15 comprises a locking circuit (e.g. inside control unit 20) which can be activated by the activation key unit 30. The control unit 20 is designed with extra logic to intentionally work only if a proper activation code is applied from the activation key unit 30. This technique is also described as IC metering, logic locking, logic encryption, logic obfuscation or hardware obfuscation. The activation process is applied after manufacturing of the integrated circuit device 1 by writing the activation code inside the activation key unit 30, e.g. write the correct activation code in a tamper-proof (secure) memory part. As the integrated circuit device 1 can then only be activated using this activation code (which may also be the secure key as described above), various types of possible attacks are prevented. An attack during design (e.g. a company with (unauthorised) access to the chip design) cannot sell the integrated circuit devices 1 produced as it will not work without the secure key. An attack during manufacture (e.g. a foundry producing more chips than agreed) will also be blocked, as the correct secure key is not known to the manufacturer.

As an example, the activation code of logic encryption inside control unit 20 may be based on the unique key generated by key generation unit 29, e-fused keys at activation key unit 30, or a combination of both. For activation of the authentication unit 15, e.g. the key generation unit 29 module is challenged and based on the response a (correct) part secure key is generated, possibly in combination with a further part secure key based on E-fused hardware at activation key unit 30. The combined activation code is then used to unlock the control unit 20 which consequently unlocks the authentication unit 15, after which the boot of the entire integrated circuit device 1 can be started.

In all embodiments, security is furthermore maintained during all the usage phases of the integrated circuit device 1, i.e., installation of new program data (e.g. apps), updates thereof, and while running the application and during communication with the central server 17 and/or other IoT devices 1.

To authenticate data or applications from the storage memory units 5, 7, 9 (e.g. flash memory), the authentication unit 15 uses a secure key to calculate the hash value of the data before storage, or when retrieving data from the storage memory units 5, 7, 9, a calculated hash value is matched with the stored and retrieved hashes. This makes sure that only authentic application data and other data are read. The same applies to the operating system. Data that is generated locally will be stored with a secure hash. This hash is also calculated by the authentication unit 15.

As described above, the authentication unit 15 comes with an optional encryption unit 27 and decryption unit 28 for data storage in the DRAM and/or flash to increase the security. On top of that, to be able to disable the entire integrated circuit device 1, logic locking is used (e.g. using the key generation unit 29/key derivation unit 31 and the activation key unit 30 to generate a unique activation key based on e.g. PUFs that are E-fused (e.g. using the secure key generation unit 29 described above). The generated key from key generation unit 29/key derivation unit 31 is then also used for the secure hashing.

In the embodiments shown and described with reference to FIGS. 3 and 4, various security functions (hash and encryption) may be applied to the static storage unit 7 (Flash) and/or the dynamic storage unit 9 (DRAM), providing a total of sixteen possible combinations as shown in the below table of combinations:

| | COMBINATIONS | | | | | |
|---|---|---|---|---|---|---|
| | FLASH | | DRAM | | BOOT ROM | |
| | Hash | Encryption | Hash | Encryption | Hash | Encryption |
| 1 | YES | NO | NO | NO | YES | YES |
| 2 | | | | | | NO |
| 3 | | | | YES | | YES |
| 4 | | | | | | NO |
| 5 | | | YES | NO | | YES |
| 6 | | | | | | NO |
| 7 | | | | YES | | YES |
| 8 | | | | | | NO |
| 9 | | YES | NO | NO | | YES |
| 10 | | | | | | NO |
| 11 | | | | YES | | YES |
| 12 | | | | | | NO |
| 13 | | | YES | NO | | YES |
| 14 | | | | | | NO |

| COMBINATIONS | | | | | |
|---|---|---|---|---|---|
| FLASH | | DRAM | | BOOT ROM | |
| Hash | Encryption | Hash | Encryption | Hash | Encryption |
| 15 | | | YES | | YES |
| 16 | | | YES | | NO |

The various types of memory present in the present invention embodiments of the integrated circuit device 1 may be implemented as one of various alternatives. In one embodiment, the associated storage memory units 5, 7, 9 comprise a memory unit with no parity. The hash value can e.g. be appended to each N byte word (N is e.g. 64), or alternatively can be stored in a separate memory area (requiring an additional memory access).

Alternatively (or additionally), the associated storage memory units 5, 7, 9 comprise a memory unit with parity bits. In this case, the regular parity bits field can be filled with the calculated hash value, thus requiring no or minimum additional resources for storing the hash values.

In an even further alternative or additional embodiment, the associated storage memory units 5, 7, 9 comprise a memory unit with error correcting code (ECC). Similar to the first implementation (memory without parity), the hash value can be added to each data word, or in a separate memory area.

The present invention has been described above with reference to a number of exemplary embodiments as shown in the drawings. Modifications and alternative implementations of some parts or elements are possible, and are included in the scope of protection as defined in the appended claims.

The invention claimed is:

1. An integrated circuit device comprising:
a processor module in communication with a cache memory module and with one or more input/output units for external communication, and
one or more memory control modules each arranged to interface with an associated storage memory unit,
the integrated circuit device further comprising an authentication module in communication with the one or more memory control modules and the cache memory module,
the authentication module performing an authentication and being arranged to:
generate a hardware based secure key based on hardware features of the integrated circuit device;
store the hardware based secure key;
read a predetermined set of data from the associated storage memory units via the memory control modules, and an associated stored hash value;
calculate a hash value of the predetermined set of data using the hardware based secure key; and
store the predetermined set of data in the cache memory module only if the calculated hash value of the predetermined set of data corresponds to the associated stored hash value,
read a further predetermined set of data from the cache memory module,
calculate a hash value of the further predetermined set of data using the hardware based secure key; and
store the further predetermined set of data and the calculated hash value of the further predetermined set of data in the associated storage memory units via the memory control modules.

2. The integrated circuit device according to claim 1, wherein the cache memory module comprises a program cache module and a data c ache module.

3. The integrated circuit device according to claim 1, wherein the one or more memory control modules comprise a boot loader, and the associated storage memory unit comprises a boot read-only memory module.

4. The integrated circuit device according to claim 1, wherein the one or more memory control modules comprise a static memory control module, and the associated storage memory unit comprises a static storage unit.

5. The integrated circuit device according to claim 1, wherein the one or more memory control modules comprise a dynamic memory control module, and the associated storage memory unit comprises a dynamic storage unit.

6. The integrated circuit device according to claim 1, wherein the authentication module further comprises encrypting data before storage in the associated storage memory units via the one or more memory control modules.

7. The integrated circuit device according to claim 1, wherein the authentication module further comprises decrypting data before storage in the cache memory module.

8. The integrated circuit device according to claim 1, wherein the authentication module further comprises a secure key generation unit.

9. The integrated circuit device according to claim 1, wherein the associated storage memory units comprise a memory unit with no parity.

10. The integrated circuit device according to claim 1, wherein the associated storage memory units comprise a memory unit with parity bits.

11. The integrated circuit device according to claim 1, wherein the associated storage memory units comprise a memory unit with error correcting code.

12. A method for updating data in an integrated circuit device, the method comprising:
performing a first authentication by the integrated circuit device of a central server;
performing a second authentication of the integrated circuit device by the central server;
receiving and storing data by the integrated circuit device sent by the central server in response to determining the first authentication and the second authentication are successful, wherein the integrated circuit device is an integrated circuit device according to claim 1.

13. A method for setting up a communication path between a first integrated circuit device and a second integrated circuit device, the method comprising:
performing an authentication of the first integrated circuit device and the second integrated circuit device by a central server;
in response to determining the authentication of the first integrated circuit device and the second integrated circuit device is successful, notifying the first integrated circuit device and the second integrated circuit device of their mutual authentication by the central server;
establishing the communication path between the first integrated circuit device and the second integrated circuit device; and
exchanging data via the communication path, wherein the first integrated circuit device and the second integrated circuit device are an integrated circuit device according to claim 1.

14. The method according to claim 13, further comprising by the central server:
- receiving a communication request, the communication request comprising a first device identification associated with the first integrated circuit device, and address identification of both the first integrated circuit device and the second integrated circuit device;
- sending a challenge message to the second integrated circuit device, and
- receiving a second device identification associated with the second integrated circuit device.

\* \* \* \* \*